2,835,676

GAMMA-KETO-TERTIARY AMINES AND DERIVATIVES THEREOF

James M. Sprague, Gwynedd Valley, and Everett M. Schultz, Ambler, Pa., assignors to Merck & Co., Inc., Rahway, N. J., a corporation of New Jersey No Drawing. Application July 14, 1953
Serial No. 367,988

6 Claims. (Cl. 260—294.7)

This invention is concerned with certain new chemical compounds. It is more particularly concerned with gamma-keto-tertiary amines and quaternary ammonium derivatives thereof, containing as a substituent on the carbonyl carbon an arylmethyl group, substituted at least once in the alpha position of the arylmethyl group. This application is in part a continuation of our presently pending application Serial No. 230,092, filed June 5, 1951, now abandoned, which in turn was in part a continuation of application Serial No. 151,044, filed March 21, 1950, now abandoned.

The new chemical compounds embraced by this invention can be represented by the general formula,

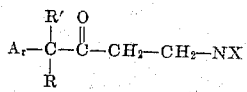

the non-toxic acid salts and the quaternary ammonium derivatives thereof, in which $A_r$ is an aryl radical selected from the unsubstituted phenyl radical and a phenyl radical containing not more than 2 substituents selected from the group consisting of hydroxy, lower alkyl, chlorine, bromine and lower alkoxy radicals; R is chosen from the group consisting of a lower alkyl, cycloalkyl, allyl, $A_r$- and $A_r=CH_2$—; R' is chosen from the group consisting of hydrogen, hydroxy, lower alkyl, allyl, cycloalkyl, $A_r$- and $A_r$-$CH_2$— and NX is chosen from the class consisting of di-lower alkylamino, 1-piperidyl, and 4-morpholinyl.

The gamma-keto-tertiary amines of this invention are obtained by the reaction of ketones of the general formula

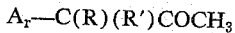

with formaldehyde and a secondary amine, HNX, according to the Mannich reaction:

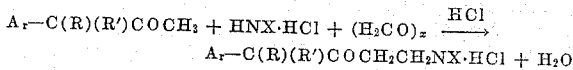

The particular adaptation of the Mannich reaction used in this invention consists in admixing the appropriate ketone with the hydrochloride of the proper secondary amine and paraformaldehyde with or without an appropriate solvent in a reaction vessel equipped for reflux. To this mixture is added a small quantity of alcoholic hydrochloric acid. This mixture is stirred mechanically and maintained at a temperature of approximately 100° C. until the mixture becomes homogeneous.

The reflux apparatus is then removed and the heating continued until formaldehyde is no longer evolved. On cooling, the reaction mixture crystallizes and the product, the hydrochloride of the aminoketone, is purified by recrystallization.

The quaternary ammonium derivatives are prepared by reacting the free aminoketone base with quaternizing agents according to known procedures. The usual quaternizing agents can be employed for this purpose, for example, dialkylsulfates as dimethylsulfate, diethylsulfate and the like, alkyl halides as methyl chloride, ethyl bromide and the like, arylaliphatic halides as benzyl chloride, cinnamyl iodide and the like which illustrate a few representative types.

The gamma-keto-tertiary amines and their quaternary ammonium derivatives of this invention are useful for their anticholinergic properties.

The invention is illustrated by, but not restricted to, the following examples:

Example 1 — 1-phenyl-1-ethyl-4-dimethylamino-2-butanone hydrochloride. — 3-phenyl-2-pentanone (16.2 grams, 0.1 mole), paraformaldehyde (4.5 grams, 0.15 mole), dimethylamine hydrochloride (12.2 grams, 0.15 mole), and 10 drops of 8 N alcoholic hydrogen chloride were mixed and heated with shaking on a steam bath. First, two layers formed, but after heating for five hours there was obtained a homogeneous yellow oil that solidified to an oily solid on cooling. The solid was triturated with absolute ether, collected by filtration, and dissolved in water. The cloudy solution was extracted with ether and made basic with concentrated ammonium hydroxide solution. The free base was extracted with ether. After washing the ether solution with water it was dried over sodium sulfate and concentrated by evaporation to a small volume to remove any dimethylamine. Then ether was added to make up the original volume and the base was precipitated by the addition of hydrogen chloride. The white solid, 1-phenyl-1-ethyl-4-dimethylamino-2-butanone hydrochloride, was collected by filtration, washed with ether, dried in vacuum over sulfuric acid and crystallized from reagent acetone (300 ml.). There was obtained 7.4 grams (30%) of product, M. P. 144–145°.

Example 2 — 1-phenyl-1-ethyl-4-(1-piperidyl)-2-butanone hydrochloride. — 3-phenyl-2-pentanone (16.2 grams, 0.1 mole), paraformaldehyde (3.3 grams, 0.11 mole), piperidine hydrochloride (12.2 grams, 0.1 mole), and 10 drops of 8 N alcoholic hydrogen chloride were mixed in a round-bottomed flask fitted with a short air condenser and mechanical stirrer. The flask was heated with stirring on a steam bath. After one hour the contents became solid. The solid was triturated in ether and after collecting it by filtration it was crystallized three times from reagent acetone. There was obtained 5.3 grams (18%) of a white powder, 1-phenyl-1-ethyl-4-(1-piperidyl)-2-butanone hydrochloride, M. P. 162–163°.

Example 3 — 1-phenyl-1-n-propyl-4-(4-morpholinyl)-2-butanone hydrochloride. — 3-phenyl-2-hexanone (14.0 grams), morpholine hydrochloride (12.4 grams), paraformaldehyde (3.0 grams) and 1 ml. of 4 N alcoholic hydrogen chloride were stirred and heated on a steam bath for two hours. The solid cake that resulted was dissolved in 15 ml. hot isopropyl alcohol. A crystalline product separated when the solution was chilled. Upon recrystallization from a mixture of 10 parts of acetone and 1 part of ethanol there was obtained 1-phenyl-1-propyl-4-(4-morpholinyl)-2-butanone hydrochloride, M. P. 155.5–156.5° C.

Example 4—1-phenyl-1-isopropyl-4-(1-piperidyl)-2-butanone hydrochloride. — 4-methyl-3-phenyl-2-pentanone (257 grams, 1.46 mole), piperidine hydrochloride (199 grams, 1.63 mole) paraformaldehyde (46.4 grams, 1.55 mole) and 10 ml. 3 N alcoholic hydrogen chloride were stirred on a steam bath until the mixture solidified. This occurred in approximately thirty-five minutes after which the solid cake was heated for an additional one-half hour. The cake was broken up and dissolved in boiling isopropyl alcohol (750 ml.), and the solution allowed to cool to room temperature and then was chilled to 0° C. for approximately four hours. The solid was collected on a filter and washed with one 150 ml. portion of ether after which it was dried and recrystallized from boiling isopropyl alcohol. There was obtained 1-phenyl-1-isopropyl-4-(1-piperidyl)-2-butanone hydrochloride, M. P. 183–184° C.

Example 5—1 - phenyl - 1-isopropyl-4-dimethylamino-2-butanone hydrochloride.—1 - isopropyl-1-phenylacetone (35.3 grams, 0.2 mole), paraformaldehyde (16.6 grams, 0.22 mole), dimethylamine hydrochloride (17.9 grams, 0.22 mole), and 2 ml. of 9% alcoholic hydrogen chloride were reacted according to the procedure described in Example 3. The mixture was heated for twenty-three hours, the last 16 hours without stirring, and the solid product was triturated with ether and recrystallized from tertiary butyl alcohol. There was obtained 28 grams (52%) of white crystalline solid, 1-phenyl-1-isopropyl-4-dimethylamino-2-butanone hydrochloride, M. P. 163–164°.

Example 6—N-(3-oxo-4 - phenyl - 5 - methylhexyl)-trimethylammonium methylsulfate.—5.4 grams (0.02 mole) of 1-phenyl-1-isopropyl-4-dimethylamino-2-butanone hydrochloride, obtained as described above in Example 5, was dissolved in water and the solution made basic by addition of aqueous sodium hydroxide. The insoluble base thus obtained was separated by filtration and then taken up in ether and the ether solution dried over potassium carbonate. Dimethylsulfate was added gradually to the ethereal solution of the base. A vigorous reaction ensued and a precipitate appeared immediately. After the reaction mixture had been kept at 20–25° C. for one hour, the solid precipitate was collected by filtration. It weighed 6.5 grams, M. P. 140–144° C. After two crystallizations from isopropyl alcohol, there was obtained 5.4 grams (76% yield) of N-(3-oxo-4-phenyl-5-methyl)-hexyl-trimethylammonium methylsulfate, M. P. 146–147° C.

Example 7—1 - phenyl-1-allyl-4-dimethylamino-2-butanone hydrochloride.—A mixture of 1-allyl-1-phenylacetone (17.4 grams, 0.1 mole), paraformaldehyde (3.3 grams, 0.11 mole), dimethylamine hydrochloride (8.2 grams, 0.11 mole) and 1 ml. alcoholic hydrogen chloride was stirred and heated for one and three-quarter hours in a manner similar to that described in Example 3. After cooling and triturating the reaction product with ether the insoluble residue was boiled with 300 ml. of dry benzene. The hot benzene solution was decanted through a filter from a layer of undissolved oil. On cooling the benzene deposited 3.6 grams of a white powder. The oil from the benzene extraction was dissolved in hot acetone. On cooling, this solution deposited 2.8 grams of material. The two solid materials were combined and recrystallized from acetone to give 5.5 grams (20%) of white powder, 1-phenyl-1-allyl-4-dimethylamino-2 - butanone hydrochloride, M. P. 125–127°.

Example 8—1-phenyl-1-lauryl-4-dimethylamino-2-butanone hydrochloride.—3 - phenyl - 2 - pentadecanone (13.2 grams, 0.1 mole), paraformaldehyde (3.3 grams, 0.11 mole), dimethylamine hydrochloride (8.2 grams, 0.1 mole), and 10 drops of 8 N alcoholic hydrogen chloride were mixed in a round-bottomed flask fitted with a short air condenser and a mechanical stirrer. The flask was heated with stirring on a steam bath and after the contents became solid, the solid was triturated in ether. After collecting it by filtration, it was recrystallized from reagent acetone yielding the desired product, 1-phenyl-1-lauryl-4-dimethylamino-2-butanone hydrochloride.

Example 9—1 - phenyl-1-benzyl-4-dimethylamino-2-butanone hydrochloride.—Paraformaldehyde (3.3 grams, 0.11 mole), dimethylamine hydrochloride (8.2 grams, 0.1 mole), 3,4-diphenyl-2-butanone (19.5 grams, 0.1 mole) and 10 drops of alcoholic hydrogen chloride were heated on a steam bath with occasional shaking for seven hours. A homogeneous yellow oil resulted. This became semisolid on standing for 16 hours and was first triturated in 10 milliliters of hot dry benzene and then triturated with 10 ml. of cold reagent acetone. The residue was crystallized from 100 ml. of acetone to give 9.05 grams of fine white powdery solid, 1-phenyl-1-benzyl-4-dimethylamino-2-butanone hydrochloride, M. P. 129–130° C. Chilling the filtrate in the icebox gave an additional 1.98 grams of pure product, M. P. 129–130° C. for a total yield of 11.03 grams (34.7%).

Example 10—1-phenyl-1-benzyl-4-(1-piperidyl)-2-butanone hydrochloride.—A mixture of 3,4-diphenyl-2-butanone (22.4 grams, 0.10 mole), paraformaldehyde (4.5 grams, 0.15 mole), piperidine hydrochloride (12.2 grams, 0.10 mole), and 1 ml. of 3 N alcoholic hydrogen chloride was heated with stirring on a steam bath for 20 minutes. At this point the contents of the flask solidified. The reaction mixture was dissolved in water and the solution extracted with ether. The aqueous layer was made basic with 20% sodium hydroxide and the free base was extracted with ether. After the ether solution had been washed with water until practically neutral, it was dried over sodium sulfate and the solvent was evaporated under reduced pressure at 30° C. to remove any unreacted piperidine. The residue was then taken up in absolute ether. Then dry hydrogen chloride was added to precipitate the aminoketone as the hydrochloride. The crude dried product weighed 24 grams. Two crystallizations from acetone were required to obtain the pure product, 1-phenyl-1-benzyl-4-(1-piperidyl)-2-butanone hydrochloride, M. P. 145–148° C. (16 grams, 47% yield).

Example 11—1-phenyl-1-methyl-1-hydroxy-4-dimethylamino-2-butanone hydrochloride.—3-hydroxy-3-phenyl-2-butanone (16.4 grams, 0.10 mole), paraformaldehyde (4.5 grams, 0.15 mole), dimethylamine hydrochloride (8.15 grams, 0.1 mole) and 1 ml. of 3 N alcoholic hydrogen chloride were heated on a steam bath with stirring for four hours under an air condenser and for an additional hour in the open flask. The resulting clear oil solidified after standing at room temperature for a few hours. The solid mass was triturated with ether and after collecting by suction filtration the precipitate was crystallized four times from acetone. There was obtained 4.85 grams (19% yield) of 1-phenyl-1-methyl-1-hydroxy-4-dimethylamino-2-butanone hydrochloride, M. P. 112–114° C.

Example 12—1 - phenyl - 1 - methyl - 1 - hydroxy-4-(1-piperidyl)-2-butanone hydrochloride.—By substituting in Example 10 an equimolar quantity of piperidine hydrochloride for the dimethylamine hydrochloride there used, and following the procedure as outlined, there was obtained 15.7 grams (66% yield) of 1-phenyl-1-methyl-1-hydroxy-4-(1-piperidyl)-2-butanone hydrochloride, M. P. 150–151° C.

Example 13—1,1 - diphenyl-4-diethylamino-2-butanone hydrochloride.—This compound was prepared by following a procedure similar to that outlined in Example 3 and using α,α-diphenylacetone (21 grams, 0.10 mole), diethylamine hydrochloride (12 grams, 0.11 mole), paraformaldehyde (3.3 grams, 0.11 mole) and 1 ml. of 7 N alcoholic hydrogen chloride. After heating the reaction mixture on a steam bath for one and one-half hours the solid product was crystallized from alcohol, then from acetone and finally from isopropyl alcohol. There was obtained 14 grams (37% yield) of white needles, 1,1-diphenyl-4-diethylamino-2-butanone hydrochloride, M. P. 144–145° C.

Example 14—1,1-diphenyl-4-(1-piperidyl)-2-butanone hydrochloride.—α,α-Diphenylacetone (13.1 grams, 0.0675 mole) was melted on a steam bath. Piperidine hydrochloride (12 grams, 0.1 mole), paraformaldehyde (3 grams, 0.1 mole) and 12 drops of 7 N alcoholic hydrogen chloride was added. The mixture was heated on a steam bath with occasional shaking for 20 minutes. The mixture solidified to a mass that was quite insoluble in water. The solid 1,1-diphenyl-4-(1-piperidyl)-2-butanone hydrochloride with triturated with two 30 ml. portions of 1:5 hydrochloric acid and then with 30 ml. of acetone and dried in air at 50°. After crystallization from absolute alcohol (U. S. P.) it melted at 199–200° (10 grams, 43.5% yield).

Example 15—1,1 - diphenyl-1-methyl-4-dimethylamino- 2-butanone hydrochloride.—3,3 - diphenyl - 2 - butanone (13.6 grams, 0.06 mole), dimethylamine hydrochloride (4.9 grams, 0.06 mole) paraformaldehyde (2.0 grams, 0.066 mole), and 25 drops of 7 N alcoholic hydrogen chloride were heated with occasional shaking on a steam bath for 3¼ hours. The solid that formed on cooling was triturated with 30 ml. of acetone, collected by filtration, and washed with acetone. The solid weighed 9 grams and melted at 158–161°. After one crystallization from isopropyl alcohol, there was obtained 7 grams (37%) of 1,1-phenyl-1-methyl-4-dimethylamino-2-butanone hydrochloride, M. P. 165–166°.

*Example 16—1,1-diphenyl-1-ethyl-4-dimethylamino-2-butanone hydrochloride.*—Following the procedure outlined in Example 3, 1,1-diphenyl-1-ethyl-2-propanone (11.9 grams, 0.05 mole), dimethylamine hydrochloride (4.5 grams, 0.055 mole), paraformaldehyde (1.7 grams, 0.055 mole), and 1 ml. of 1 N alcoholic hydrogen chloride were heated with stirring on a steam bath for 26 hours. The solid which formed on cooling was triturated with ether and crystallized four times from acetone. There was obtained 5.2 grams (31%) of 1,1-diphenyl-1-ethyl-4-dimethylamino-2-butanone hydrochloride, M. P. 152–153°.

*Example 17—1,1 - diphenyl-1-allyl-4-dimethylamino-2-butanone hydrochloride.*—Using the procedure outlined in example 3 and 0.06 mole quantities of 1,1-diphenyl-1-allyl-2-propanone, paraformaldehyde, and dimethylamine hydrochloride, after successive recrystallizations of the product from ethyl acetate, benzene, and acetone there was obtained 1,1 - diphenyl-1-allyl - 4 - dimethylamino-2-butanone hydrochloride, M. P. 134–135°.

*Example 18—1 - phenyl-1,1-di-n-propyl - 4 - dimethylamino-2-butanone hydrochloride.*—Using the procedure outlined in Example 3 and similar molar quantities of 3-phenyl-3-n-propyl-2-hexanone, paraformaldehyde, and dimethylamine hydrochloride, there was obtained 1-phenyl-1,1-di-n-propyl - 4 - dimethylamino-2-butanone hydrochloride.

*Example 19—1 - phenyl-1,1-diallyl-4-dimethylamino-2-butanone hydrochloride.*—Using the procedure outlined in Example 3 and similar quantities of 3-phenyl-3-allyl-5-hexen-2-one, paraformaldehyde and dimethylamine hydrochloride, there was obtained 1-phenyl-1,1-diallyl-4-dimethylamino-2-butanone hydrochloride.

*Example 20—1-(m,p-dimethoxyphenyl)-1-n-propyl-4-dimethylamino-2-butanone hydrochloride.*—Using the procedure outlined in Example 3 and similar molar quantities of 3-(m,p-dimethoxyphenyl)-2-hexanone, paraformaldehyde, and dimethylamine hydrochloride, there was obtained 1 - (m,p-dimethoxyphenyl)-1-n-propyl-4-dimethylamino-2-butanone hydrochloride.

*Example 21—1-(p-chlorophenyl)-1-propyl-4-dimethylamino-2-butanone hydrochloride.*—Using the procedure outlined in Example 3 and similar molar quantities of 3-(p-chlorophenyl)-2-hexanone, paraformaldehyde, and dimethylamine, there was obtained 1-(p-chlorophenyl)-1-propyl-4-dimethylamino-2-butanone hydrochloride.

*Example 22—1 - (1 - piperidyl)-4-(p-tolyl)-4-phenyl-3-butanone hydrochloride.*—p-Tolyl-phenylacetone (22.4 grams, 0.1 mole) [prepared from phenylacetone and toluene in the manner described for the preparation of diphenylacetone from phenylacetone and benzene (Organic Synthesis 29, 38, (1949))], paraformaldehyde (3.3 grams, 0.11 mole), piperidine hydrochloride (12.2 grams, 0.1 mole) and concentrated hydrochloric acid (0.25 ml.) were mixed and heated with vigorous mechanical stirring on a steam bath for one hour. The solid cake thus produced was crystallized from isopropyl alcohol yielding 1-(1-piperidyl)-4-(p-tolyl)-4-phenyl-3-butanone hydrochloride, M. P. 181.2–182.5° C.

*Example 23—1-(1 - piperidyl) - 4 - (p-ethylphenyl)-4-phenyl-3-butanone hydrochloride.*—By replacing the p-tolylphenylacetone by an equimolecular quantity of p-ethylphenyl-phenylacetone (prepared from phenylacetone and phenylethane in the manner described in Organic Synthesis 29, 38 (1949), for the preparation of diphenylacetone) and following substantially the same procedure described in Example 22, there is obtained 1-(1-piperidyl) - 4 - (p-ethylphenyl)-4-phenyl-3-butanone hydrochloride.

*Example 24—1 - (1 - piperidyl)-4-(p-amylphenyl)-4-phenyl-3-butanone hydrochloride.*—By replacing the p-tolyl-phenylacetone by an equimolecular quantity of p-amylphenyl-phenylacetone (prepared from phenylacetone and phenylpentane in the manner described in Organic Synthesis, 29, 38 (1949) for the preparation of diphenylacetone) and following substantially the same procedure described in Example 22, there is obtained 1-(1-piperidyl) - 4 - (p - amylphenyl)-4-phenyl-3-butanone hydrochloride.

*Example 25—5-methyl - 4 - (p-butoxyphenyl)-1-(1-piperidyl)-3-hexanone hydrochloride.*—The heretofore unknown p-butoxyphenylacetone first was prepared from p-butoxybenzaldehyde (136 grams, 0.765 mole) and nitroethane (65 grams, 0.85 mole) in substantially the same manner described in the Journal of Organic Chemistry 12, 501 (1947). This compound (75 grams, 0.365 mole) was isopropylated by reaction with isopropyl iodide (62 grams, 0.365 mole) in the presence of potassium tertiary butoxide (0.365 mole) in the usual manner, [Journal of the American Chemical Society 75, 1072 (1953)], to obtain 1-(p-butoxyphenyl)-1-isopropylacetone. The latter compound (12.4 grams, 0.05 mole), paraformaldehyde (3.0 grams, 0.1 mole), piperidine hydrochloride (6.5 grams, 0.054 mole) and a few drops of alcoholic hydrogen chloride were heated with vigorous mechanical stirring on a steam bath for one hour. The solid cake thus obtained was crystallized from acetone and from isopropyl alcohol yielding 5-methyl-4-(p-butoxyphenyl)-1-(1-piperidyl)-3-hexanone hydrochloride, M. P. 177–178° C.

*Example 26—5 - methyl - 4 - (m,p - dibutoxyphenyl)-1 - (1 - piperidyl) - 3 - hexanone hydrochloride.*—By replacing the p-butoxyphenylacetone by an equimolecular quantity of m,p-dibutoxyphenylacetone [prepared from m,p-dibutoxybenzaldehyde and nitroethane as described in the Journal of Organic Chemistry 12, 501 (1947)], and following the same procedure described in Example 25, there is obtained 5-methyl-4-(m,p-dibutoxyphenyl)-1-(1-piperidyl)-3-hexanone hydrochloride.

*Example 27—1 - (1 - piperidyl) - 4 - (p-methoxyphenyl) - 5 - methyl - 3 - hexanone hydrochloride.*—p-Methoxyphenylacetone (0.365 mole) was isopropylated by the same process described in Example 25 to obtain 1-p-methoxyphenyl-1-isopropylacetone (B. P. 100–102° C. at 2 mm. pressure). The latter compound (10.3 grams, 0.05 mole), piperidine hydrochloride (6.5 grams, 0.054 mole), paraformaldehyde (3.0 grams, 0.1 mole) and alcoholic hydrogen chloride (0.25 ml.) were mixed and heated with vigorous mechanical stirring for one hour. The product, 1-(1-piperidyl)-4-(p-methoxyphenyl)-5-methyl-3-hexanone hydrochloride, melted at 188–190° C. after crystallizing from isopropyl alcohol.

*Example 28—1 - (1 - piperidyl) - 4 - (m-methoxyphenyl) - 5 - methyl - 3 - hexanone hydrochloride.*—By replacing the p-methoxyphenylacetone by an equimolecular quantity of m-methoxyphenylacetone and following substantially the same procedure described in Example 27, there was obtained 1-(1-piperidyl)-4-(m-methoxyphenyl)-5-methyl-3-hexanone hydrochloride, M. P. 151–152° C.

*Example 29—1 - (1 - piperidyl) - 4 - (p - hydroxyphenyl) - 5 - methyl - 3 - hexanone hydrochloride.*—By replacing the 1-(p-methoxyphenyl) acetone by an equimolecular quantity of 1-(p-hydroxyphenyl)acetone and following substantially the same procedure described in Example 27, there was obtained 1-(1-piperidyl)-4-(p-hydroxyphenyl)-5-methyl-3-hexanone hydrochloride.

*Example 30—1 - (p - bromophenyl) - 1 - propyl - 4 - dimethylamino - 2 - butanone hydrochloride.*—Using the procedure outlined in Example 3 and similar molar quantities of 3-(p-bromophenyl)-2-hexanone, paraformaldehyde and dimethylamine, there is obtained 1-(p-bromophenyl) - 1 - propyl - 4 - dimethylamino - 2 - butanone hydrochloride.

*Example 31—1 - phenyl - 1 - cyclohexyl - 4 - dimethylamino - 2 - butanone hydrochloride.*—Cyclohexylphenyl acetone (11.2 grams, 0.052 mole), paraformaldehyde (4 grams, 0.13 mole), dimethylamine hydrochloride (4.2 grams, 0.052 mole) were mixed and ½ ml. of 6 N alcoholic hydrogen chloride was added. The mixture was stirred and heated on a steam bath for three hours at which time it had become a waxy solid. The solid was removed from the reaction flask, triturated with 100 cc. of boiling absolute ether, and the solid was collected by filtration. The crude product, after drying in air at 50–60° for 24 hours, weighed 12.4 grams. After two recrystallizations from acetone, there was obtained 3.4 grams of 1-phenyl-1-cyclohexyl-4-dimethylamino-2-butanone hydrochloride, M. P. 169–170° C.

*Example 32—1 - (p - chlorophenyl) - 1 - isopropyl - 4 - (1 - piperidyl) - 2 - butanone hydrochloride.*—Using the procedure outlined in Example 3 and similar molar quantities of 3-(p-chlorophenyl)-4-methyl-2-pentanone, piperidine hydrochloride, and paraformaldehyde there was obtained 1 - (p - chlorophenyl) - 1 - isopropyl - 4 - (1-piperidyl)-2-butanone hydrochloride.

The foregoing examples are illustrative of the procedures and techniques used to prepare the aminoketone of this invention such as:

1 - phenyl - 1 - methyl - 4 - dimethylamino - 2 - butanone hydrochloride
1 - phenyl - 1 - methyl - 4 - (1 - piperidyl) - 2 - butanone hydrochloride
1 - phenyl - 1 - ethyl - 4 - dimethylamino - 2 - butanone hydrochloride
1 - phenyl - 1 - ethyl - 4 - (4 - morpholinyl) - 2 - butanone hydrochloride
1 - phenyl - 1 - ethyl - 4 - (1 - piperidyl) - 2 - butanone hydrochloride
1 - phenyl - 1 - isopropyl - 4 - dimethylamino - 2 - butanone hydrochloride
1 - phenyl - 1 - isopropyl - 4 - (1 - piperidyl) - 2 - butanone hydrochloride
1 - phenyl - 1 - propyl - 4 - (4 - morpholinyl) - 2 - butanone hydrochloride
1 - phenyl - 1 - allyl - 4 - dimethylamino - 2 - butanone hydrochloride
1 - phenyl - 1 - n - propyl - 4 - dimethylamino - 2 - butanone hydrochloride
1 - phenyl - 1 - n - propyl - 4 - (1 - piperidyl) - 2 - butanone hydrochloride
1 - phenyl - 1 - allyl - 4 - (1 - piperidyl) - 2 - butanone hydrochloride
1 - phenyl - 1 - n - butyl - 4 - dimethylamino - 2 - butanone hydrochloride
1 - phenyl - 1 - lauryl - 4 - dimethylamino - 2 - butanone hydrochloride
1 - phenyl - 1 - benzyl - 4 - dimethylamino - 2 - butanone hydrochloride
1 - phenyl - 1 - benzyl - 4 - (1 - piperidyl) - 2 - butanone hydrochloride
1,1 - diphenyl - 4 - dimethylamino - 2 - butanone hydrochloride
1,1 - diphenyl - 4 - diethylamino - 2 - butanone hydrochloride
1,1 - diphenyl - 4 - (1 - piperidyl) - 2 - butanone hydrochloride
1,1 - diphenyl - 1 - methyl - 4 - dimethylamino - 2 - butanone hydrochloride
1,1 - diphenyl - 1 - ethyl - 4 - dimethylamino - 2 - butanone hydrochloride
1,1 - diphenyl - 1 - allyl - 4 - dimethylamino - 2 - butanone hydrochloride
1,1 - diphenyl - 1 - n - propyl - 4 - dimethylamino - 2 - butanone hydrochloride
1 - phenyl - 1,1 - diallyl - 4 - dimethylamino - 2 - butanone hydrochloride
1 - phenyl - 1 - hydroxy - 1 - methyl - 4 - dimethylamino-2-butanone hydrochloride
1 - phenyl - 1 - hydroxy - 1 - methyl - 4 - (1 - piperidyl)-2-butanone hydrochloride
1 - (p - chlorophenyl) - 1 - n - propyl - 4 - dimethylamino-2-butanone hydrochloride
1 - (o - bromophenyl) - 1 - allyl - 4 - (1 - piperidyl)-2-butanone hydrochloride
1 - (o - chlorophenyl) - 1 - (p - bromophenyl) - 4 - diethylamino-2-butanone hydrochloride These aminoketones, of course, are obtained by starting with the appropriate ketone $A_r$—C(R)(R')COCH$_3$, and reacting it with equimolecular amounts of paraformaldehyde and the appropriate amine, HNX, according to the process described in any one of the preceding examples, in which $A_r$, R, R' and NX have the meanings heretofore assigned.

It will be realized that the radicals (represented by R, R', $A_r$ and NX in the general formula) occurring in the foregoing compounds can be replaced by the other radicals represented by a particular symbol to yield a variety of compounds other than those specifically enumerated above and it is intended that these be included within the present disclosure.

*Example 33—1,1 - diphenyl - 4 - (1 - piperidyl) - 2 - butanone.*—1,1 - diphenyl - 4 - (1 - piperidyl) - 2 - butanone hydrochloride (34.6 grams, 0.1 mole) (obtained as in Example 14) was dissolved in 200 ml. of water. This solution was made basic with 20% sodium hydroxide solution. The free amine was taken up in 150 ml. of ether. This ether solution was washed with two 50 ml. portions of water and dried over potassium carbonate. The potassium carbonate was removed by filtration and the ether by evaporation. The crude product was recrystallized from petroleum ether. There was obtained 1,1-diphenyl-4-(1-piperidyl)-2-butanone.

The above outlined procedure for obtaining the free amine from the hydrochloride is applicable to any of the salts of the compounds of the invention. Of course, in those instances in which the free amine is liquid rather than solid, it is conveniently isolated from the ether solution (from which the drying agent, potassium carbonate, has been removed) by simple evaporation of the ether.

Other examples of the isolation of the free amines of the compounds of this invention are not included because to do so would be repetitious as the above outlined procedures are applicable to any of the compounds of this invention.

It is to be realized that the aminoketones of this invention are more stable in the form of their salts than as the free amines and they are customarily utilized in the form of their salts. Any non-toxic salt can be prepared and are envisaged within the scope of this invention. Particularly suitable salts are those which are non-toxic and water soluble, for example salts prepared from inorganic acids and organic acids such as, for example, hydrochloric acid, hydrobromic acid, sulfuric acid, glycolic acid, tartaric acid and p-toluenesulfonic acid to mention a few illustrative types. When the aminoketone is produced in the form of a salt with any given acid, it is readily converted to the salt of some other acid by treatment with alkali to liberate the free base (as illustrated by Example 33 above) and subsequent neutralization with the desired acid. After the free base is prepared, it can, of course, be converted to the salt of any desired acid by simple neutralization. The conversion of the salt of the aminoketone with one acid to the salt of another acid, or to the free base, or the neutralization of the free base to form salts, involves procedures which are well known to those skilled in the art. The following example illustrates the neutralization of the base prepared by the process outlined in Example 33 with p-toluenesulfonic acid. As the same neutralization procedure can be employed in making any of the non-toxic, water soluble salts, such as the hydrobromide, sulfate, glycolate and tartrates, other examples of the preparation of these salts are not included.

*Example 34—1,1-diphenyl - 4-(1-piperidyl)-2-butanone p-toluenesulfonate.*—1,1 - diphenyl - 4 - (1-piperidyl)-2-butanone (0.1 mole) obtained as described in Example 31, was added to an aqueous solution containing an equimolecular quantity of p-toluenesulfonic acid. The base dissolved forming an aqueous solution of the p-toluenesulfonate salt of 1,1-diphenyl-4-(1-piperidyl)-2-butanone.

The foregoing examples are illustrative but not restrictive of the scope of this invention.

What is claimed is:

1. A compound chosen from the class consisting of compounds of the formula

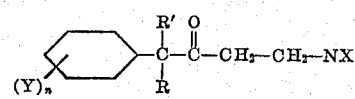

in which Y is selected from the group consisting of hydrogen, hydroxy, lower alkyl, chlorine, bromine and lower alkoxy radicals; $n$ is a whole number selected from 1 and 2; R is chosen from the group consisting of lower alkyl, cycloalkyl, allyl, phenyl, halophenyl and benzyl; R' is chosen from the group consisting of hydrogen, hydroxy, lower alkyl, and allyl; and NX is chosen from the class consisting of di-loweralkylamino, 1-piperidyl, and 4-morpholinyl, their non-toxic salts and quaternary ammonium derivatives thereof.

2. 1-phenyl-1-n-propyl-4-dimethylamino - 2 - butanone hydrochloride.

3. 1-phenyl-1-isopropyl - 4 - (1-piperidyl)-2-butanone hydrochloride.

4. 1-phenyl-1-isopropyl - 4 - dimethylamino-2-butanone hydrochloride.

5. 1-phenyl-1-cyclohexyl - 4 - dimethylamino-2-butanone hydrochloride.

6. 1-phenyl-1-benzyl-4-dimethylamino - 2-butanone hydrochloride.

References Cited in the file of this patent

UNITED STATES PATENTS 2,550,745  Wilder et al. _____ May 1, 1951

FOREIGN PATENTS 372,212  France _____ Mar. 28, 1907